United States Patent

[11] 3,631,886

| [72] | Inventor | Paul W. Heiden |
| | | Trumbull, Conn. |
| [21] | Appl. No. | 67,448 |
| [22] | Filed | Aug. 27, 1970 |
| [45] | Patented | Jan. 4, 1972 |
| [73] | Assignee | National Distillers and Chemical Corporation |
| | | New York, N.Y. |

[54] COMBINED INLET AND PRESSURE RELIEF VALVE
3 Claims, 6 Drawing Figs.

[52] U.S. Cl..................................................... 137/493.6,
137/102, 137/226
[51] Int. Cl..................................................... F16k 15/20
[50] Field of Search............................................ 141/295,
296; 137/226

[56] References Cited
UNITED STATES PATENTS

| 1,216,919 | 2/1917 | Ashelman...................... | 137/226 |
| 1,229,885 | 6/1917 | Chadwick...................... | 137/493.6 X |
| 2,995,148 | 8/1961 | Novak.......................... | 137/493.6 X |

Primary Examiner—Harold W. Weakley
Attorney—Allen A. Meyer, Jr.

ABSTRACT: An air inlet valve for pressure tanks, pneumatic tires, and the like, the valve comprising a tubular insert with a tire valve core and a mounting body nut, the insert having a snug sliding fit within said body nut and under normal pressure conditions being maintained in sealed relationship by means of spring pressure. When pressure conditions arise in excess of a predetermined value, the excess pressure will result in the retraction of the insert thereby opening the seal between the insert and mounting body nut and relieving excess pressure between the mating interior surface of the body nut and exterior surface of the insert to the outside atmosphere.

PATENTED JAN 4 1972
3,631,886
SHEET 1 OF 2
FIG. 1
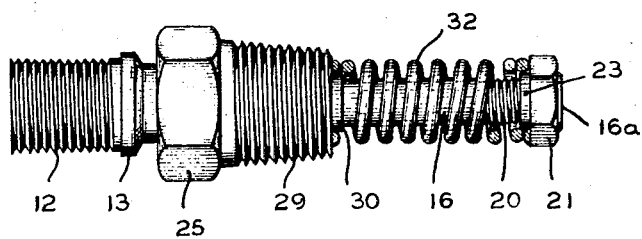
FIG. 2
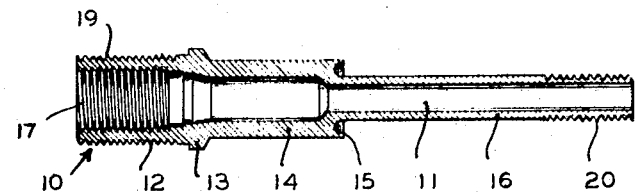
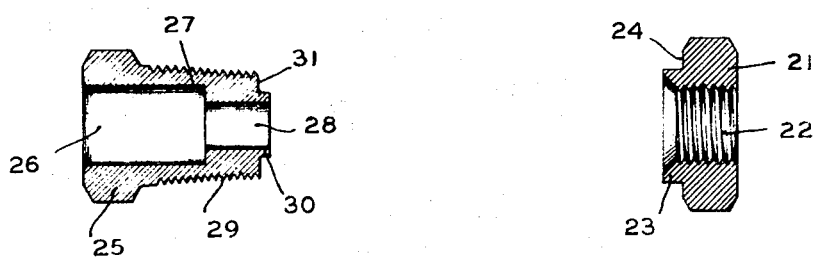
FIG. 3
FIG. 4
INVENTOR
PAUL HEIDEN
BY Allen A. Meyer, Jr.
ATTORNEY

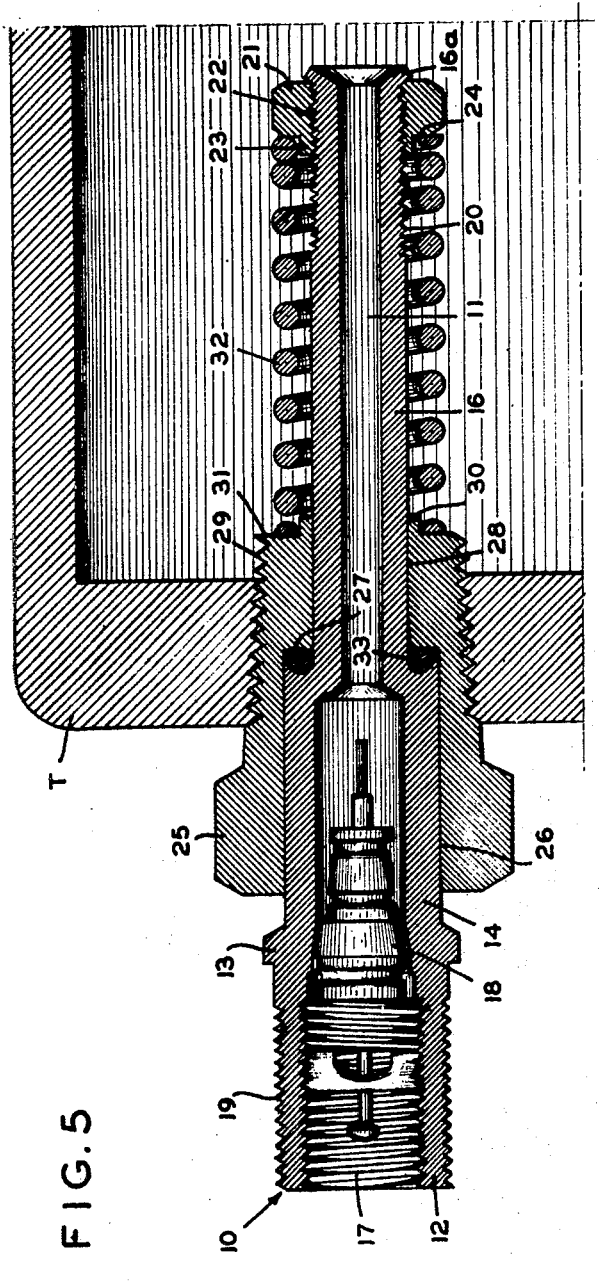
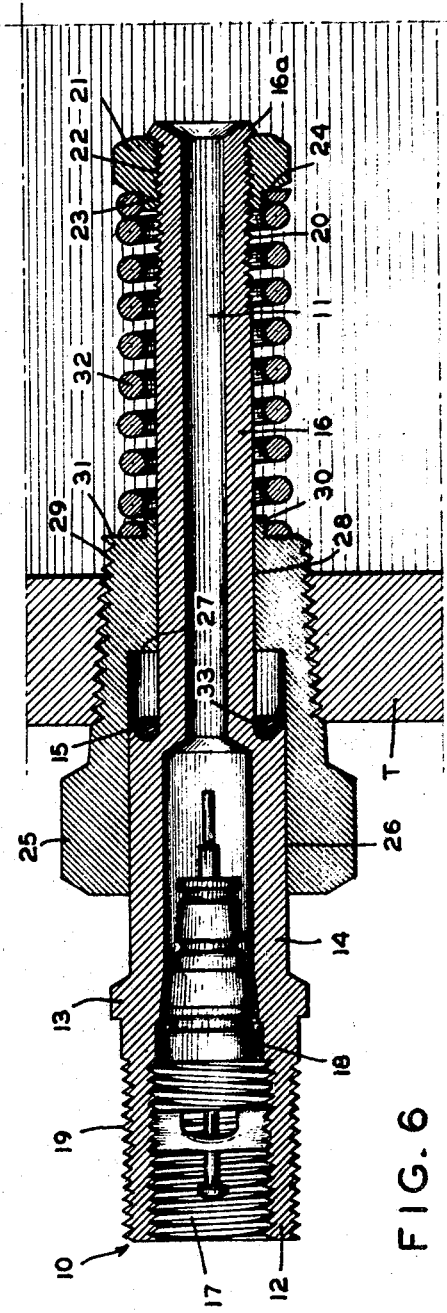

COMBINED INLET AND PRESSURE RELIEF VALVE

This invention relates to an inlet valve for pressure tanks, pneumatic tires, and the like, and more particularly to a valve of this character which will function automatically as a safety relief valve to relieve excess pressure over a predetermined value in the event that such conditions should arise.

Valves of this character are known in the art and, generally speaking, have failed to function efficiently for a plurality of reasons. These include complex valve structure with multiple moving parts; specially designed housings with bypasses for the escape of excess pressure; specially designed valve cores as well as stems which were incompatible with conventional valve assemblies; and the like. Further, such valves were costly and added materially to the expenses of installation, operation, and/or replacement when required.

Accordingly, it is a major object of the present invention to provide a novel inlet and relief valve for pressure tanks, pneumatic tires, and the like, which will include a minimum number of parts, may be installed with particular convenience, and can be produced with an economy comparable to that of the simplest inlet or inflation valves presently known in this art.

A further object of the invention is to provide a novel inlet and relief valve of the class set forth which will use the conventional tire valve core.

A still further object of the invention is to provide a novel inlet and relief valve of the character with which we here are concerned which will relieve excess pressure conditions automatically with complete safety and without any adverse noise as by vibration, chattering, or the like.

Further objects and advantages of the invention will be readily apparent from the following description taken in conjunction with the accompanying drawings, wherein:

FIG. 1 is a side-elevational view of a novel inlet and relief valve constructed in accordance with the present invention, portions of an external coil spring being broken away for purposes of clarity;

FIG. 2 is a longitudinal sectional view through the valve insert detached;

FIG. 3 is a longitudinal sectional view through the mounting body nut;

FIG. 4 is a longitudinal sectional view through the adjusting nut;

FIG. 5 is a longitudinal sectional view, on a substantially enlarged scale, through the complete valve in a closed position and in assembled relationship with a pressure tank; and FIG. 6 is a longitudinal sectional view, also on an enlarged scale and similar to FIG. 5, illustrating the valve in open position for the relief of excessive pressure conditions.

As shown in the drawings, the novel inlet and relief valve of the present invention includes a tubular insert or housing 10 having a bore 11 extending therethrough. The insert 10 preferably is of cylindrical configuration and includes an outer portion 12, an intermediate portion 14 of reduced diameter and an inner portion 16 of still further reduced diameter.

An annular flange 13 is provided between the outer portion 12 and the intermediate portion 14 and the vertically disposed shoulder 15 between the intermediate portion 14 and the inner portion 16 is provided with an annular recess having a semicircular cross-sectional configuration for the reception of a sealing ring as will be described more fully hereafter.

The outer extremity 12 of the insert is internally threaded as shown at 17 for the reception of a conventional valve core 18, as is well-known in this art, and also is externally threaded as shown at 19 for connection with a suitable source of air (fluid) under pressure when the valve is utilized in connection with a pressure tank or for the reception of the conventional dust cap when the valve is used with a pneumatic tire.

The inner extremity of the portion 16 of the insert 10 is externally threaded as shown at 20 for engagement by an adjusting nut 21 which, as shown more clearly in FIG. 4 of the drawings, is internally threaded as shown at 22 for adjustable association with the threaded extremity of the insert. Desirably this locking nut 21 has an integrally formed annular flange 23 of reduced diameter on the outer face thereof, a vertically disposed shoulder 24 being provided at the juncture of the flange or stepped down portion 23 with the body of the nut.

A mounting body nut 25 is also provided, as shown more particularly in FIG. 3 of the drawings, for the reception of the insert in sliding or reciprocal relationship and this mounting nut includes an axially aligned and centrally located bore or passage which is constituted by an outer portion 26, having a diameter complementary to that of the intermediate portion 14 of the insert, and an inner portion 28, having a reduced diameter complementary to that of the inner portion 16 of the insert, a vertically disposed shoulder 27 being provided at the juncture of the axially aligned portions 26 and 28. In manufacture, the shoulder 27 is carefully machined and polished so as to function as a seat for a conventional sealing ring 33, known in the art as an O-ring received within the annular recess in the shoulder 25 provided on the inner extremity of the intermediate portion 14 of the insert 10 when the valve is in closed position as illustrated in FIG. 5 of the drawings.

The mounting nut 25 is externally threaded as shown at 29 for convenient engagement with a wall of a pressure tank T, illustrated diagrammatically in FIGS. 5 and 6 of the drawings, or with the rim of a wheel when the valve is being used in connection with a pneumatic tire, to provide a fluidtight connection. Where necessary, or desirable, a resilient sealing member (not shown) may be provided between the adjacent faces of the body of the mounting nut and the pressure tank, rim, or other structure to which the valve is attached.

The mounting nut 25 further is provided on its inner extremity with an integrally formed annular flange 30 of reduced diameter, complementary to that of the annular flange 23 on the adjusting nut 21, the vertically disposed end wall 31 of the mounting nut providing a seat for one extremity of a coil spring 32 which is interposed between the mounting nut 25 and the adjusting nut 21, the annular flanges 23 and 30 serving to insure accurate positioning and alignment of this coil spring.

The operation of the valve is particularly simple. A source of air or fluid under pressure is applied or connected to the free extremity of the outer portion 12 of the insert or valve stem 10. This will result in the opening of the valve core 18 and the normal flow of air under pressure through the bore 11 of the insert and into the tank or other receiver to which the valve is attached. When the pressure within the receiver reaches a predetermined level, and this is ascertained and controlled by adjustment prior to valve installation of the adjusting nut 21 which varies the pressure exerted by the coil spring 32, the internal pressure overcomes that of the coil spring 32 and forces the insert outwardly thereby breaking the seal between the vertical interior surface or shoulder 27 of the mounting nut and the O-ring 33. With the breaking of this seal air under pressure will escape between the exterior surfaces of the portions 16 and 14 of the insert and the mating interior surfaces 28 and 26 of the centrally located bore in the mounting nut. This achievement of balance ore equilibrium is accomplished automatically and without vibratory influences and accompanying noises. The valve will remain open so long as the internal pressure remains excessive and, as such pressure is relieved, will return gradually to closed position. Further, under circumstances where the valve is used in connection with a pneumatic tire, or other use where temperature conditions may increase with corresponding elevation in internal pressure, the valve will function automatically as a safety valve to relieve internal pressure and avoid the possibility of damage as by blowout or comparable occurrence.

The novel inlet and relief valve thus described, separate and apart from the conventional core and external coil spring is constituted by but three elements, the stem or insert, the mounting nut, and the adjusting nut. Only one of these parts— the stem or insert—is movable during operation and such movement is limited to axial reciprocation over a particularly short distance when pressure relief is required. These parts may be produced and assembled with particular economy and will be long lasting, any necessity for repair or replacement being substantially obviated. It is contemplated that the valve as assembled during manufacture will be adjusted to function at a predetermined value or pressure dependent upon the end use contemplated. Further, to prevent inadvertent separation between the adjusting nut 21 and the insert 10, after the nut has been engaged with the threaded extremity 23 of the portion 26, the projecting extremity of the insert may be peened over as indicated at 16a.

It will be obvious to those skilled in this art that various changes may be made in the invention without departing from the spirit and scope thereof and the invention therefore is not considered limited by that which is shown in the drawings and described in the specification. Reference is had to the accompanying claims for summaries of the essentials of the invention, novel features of construction, and novel combinations of parts, for all of which protection is desired.

What is claimed is:

1. An inlet and excess pressure relief valve, for use on a pressurized container, comprising a tubular stem having an axial bore including an outer portion of maximum diameter, an intermediate portion of reduced external diameter, and an inner portion of further reduced diameter with a vertically disposed shoulder between said intermediate and inner portions, said vertically disposed shoulder being provided with an annular recess; a resilient sealing ring received in said recess; the outer extremity of said axial bore being internally threaded for the reception of an externally threaded valve core to permit passage of fluid under pressure through said axial bore; the inner extremity of said tubular stem being externally threaded for the reception of an adjusting nut; a mounting nut having an externally threaded portion for engagement with a wall surface of a pressurized container; said mounting nut having an axially aligned and centrally located bore constituted by an outer portion having a diameter complementary to that of the intermediate portion of the insert and an inner portion of a reduced diameter complementary to that of the inner portion of the insert; said mounting nut being provided with a vertically disposed internal shoulder at the juncture of the axially aligned bore portions forming a seat for the resilient sealing ring carried in the recess in the opposed vertically disposed portion of the insert; and spring means surrounding the inner portion of the insert between the opposed surfaces of the mounting nut and adjusting nut for retaining said valve in normally closed position.

2. An inlet and excess pressure relief valve as set forth in claim 1 wherein the externally threaded portion of the mounting nut is engaged with a complementarily threaded aperture in a receptacle creating a fluidproof seal between said valve and said receptacle.

3. An inlet and excess pressure relief valve as set forth in claim 1 where the innner extremity of the mounting nut is provided with an inwardly directed annular flange and the opposed surface of the adjusting nut is provided with an outwardly directed annular flange, the exterior diameters of said opposed flanges being less than the interior diameter of the spring means surrounding the inner portion of the insert, whereby the extremities of said spring means surround and are positioned by said opposed flanges.

* * * * *